United States Patent [19]

Clarke et al.

[11] 4,094,526
[45] June 13, 1978

[54] PORTABLE DISPLAY VEHICLE

[75] Inventors: Richard Allen Clarke, Greenwich; William James Chvala; Raymond Edward DeWitte, both of Danbury, all of Conn.

[73] Assignee: PepsiCo, Inc., Purchase, N.Y.

[21] Appl. No.: 694,987

[22] Filed: Jun. 11, 1976

Related U.S. Application Data

[63] Continuation of Ser. No. 491,070, Jul. 23, 1974, abandoned.

[51] Int. Cl.² .............................................. B62B 3/02
[52] U.S. Cl. .............................. 280/47.35; 108/111; 280/79.2; 312/250
[58] Field of Search .................. 280/79.2, 79.3, 47.34, 280/47.35, 47.24; 312/250; 108/65, 112, 111; 211/153, 148 R; D12/25, 29, 30

[56] References Cited

U.S. PATENT DOCUMENTS

| | | | |
|---|---|---|---|
| 596,263 | 12/1897 | Fitz | 280/79.2 |
| 976,997 | 11/1910 | Foster | 108/65 |
| 2,154,525 | 4/1939 | Noros et al. | 280/79.2 X |
| 2,580,618 | 1/1952 | Terrell | 108/112 |
| 2,921,694 | 1/1960 | Decker et al. | 280/47.24 X |
| 3,240,507 | 3/1966 | Braun | 280/79.3 X |
| 3,528,676 | 9/1970 | Marcandalli | 280/79.2 |
| 3,534,973 | 10/1970 | Elliott | 280/47.35 X |
| 3,601,256 | 8/1971 | Bowers, Jr. et al. | 211/148 |
| 3,746,358 | 7/1973 | Swick, Jr. et al. | 280/79.3 X |
| 3,856,320 | 12/1974 | Blanchard | 280/79.2 X |

Primary Examiner—Evon C. Blunk
Assistant Examiner—Michael J. Forman
Attorney, Agent, or Firm—Roylance, Abrams, Berdo & Farley

[57] ABSTRACT

There is disclosed a portable display vehicle which is useful for transporting, storing and displaying food, beverage and other displayable products. The vehicle comprises a base member having a rear edge and including a plurality of casters attached to the underside thereof for supporting the vehicle in an upright and stable condition. Sidewalls are attached in a vertical position to the sides of the base member. Between the sidewalls there is an L-shaped product support member comprising a back wall attached to a bottom shelf in such a way that the bottom shelf slopes downwardly toward the rear edge of the base member. The sidewalls and the product support member thereby form an open volume for containing the displayed products.

12 Claims, 29 Drawing Figures

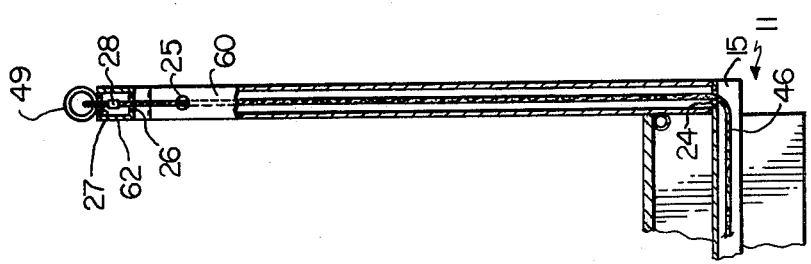
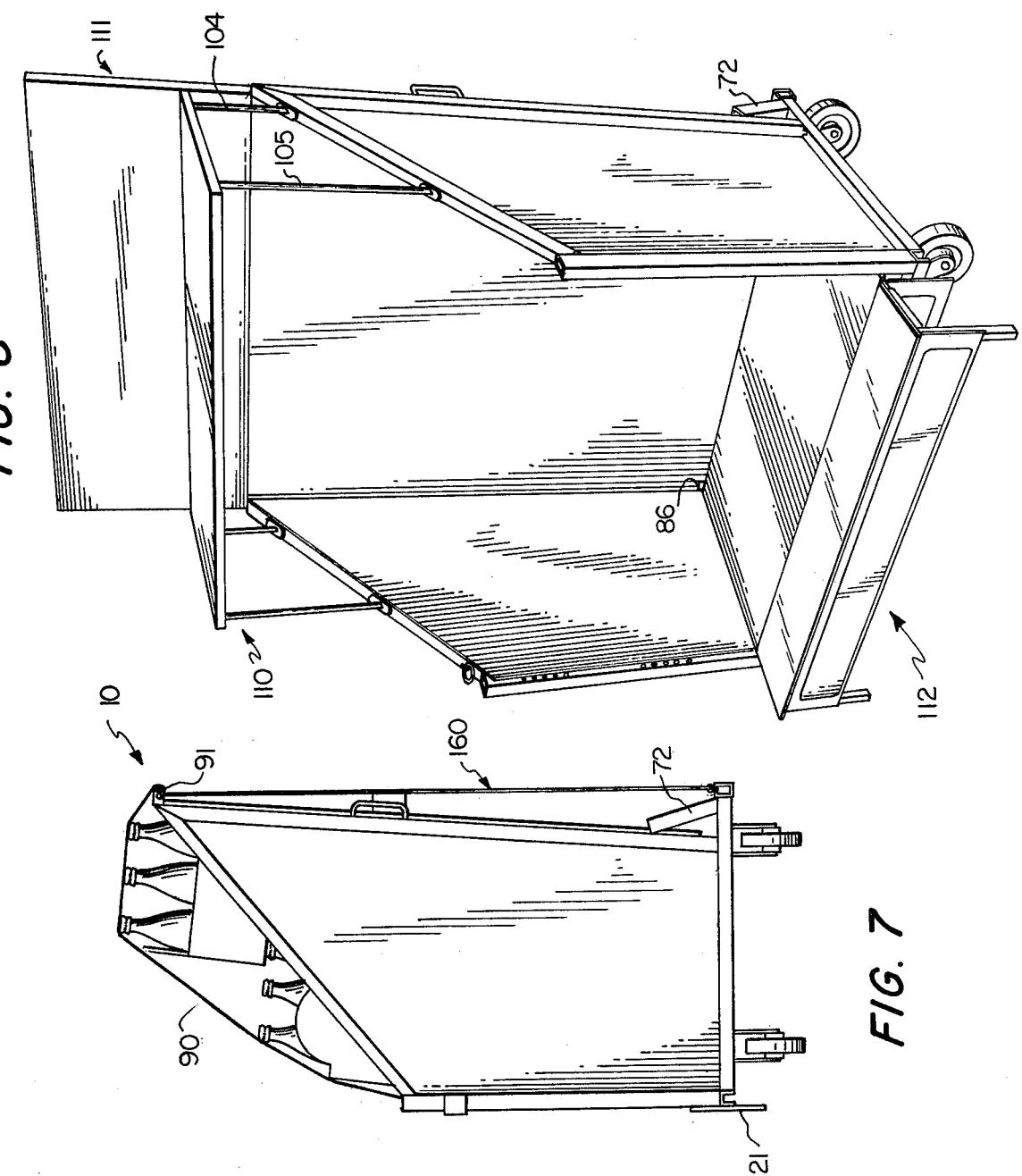

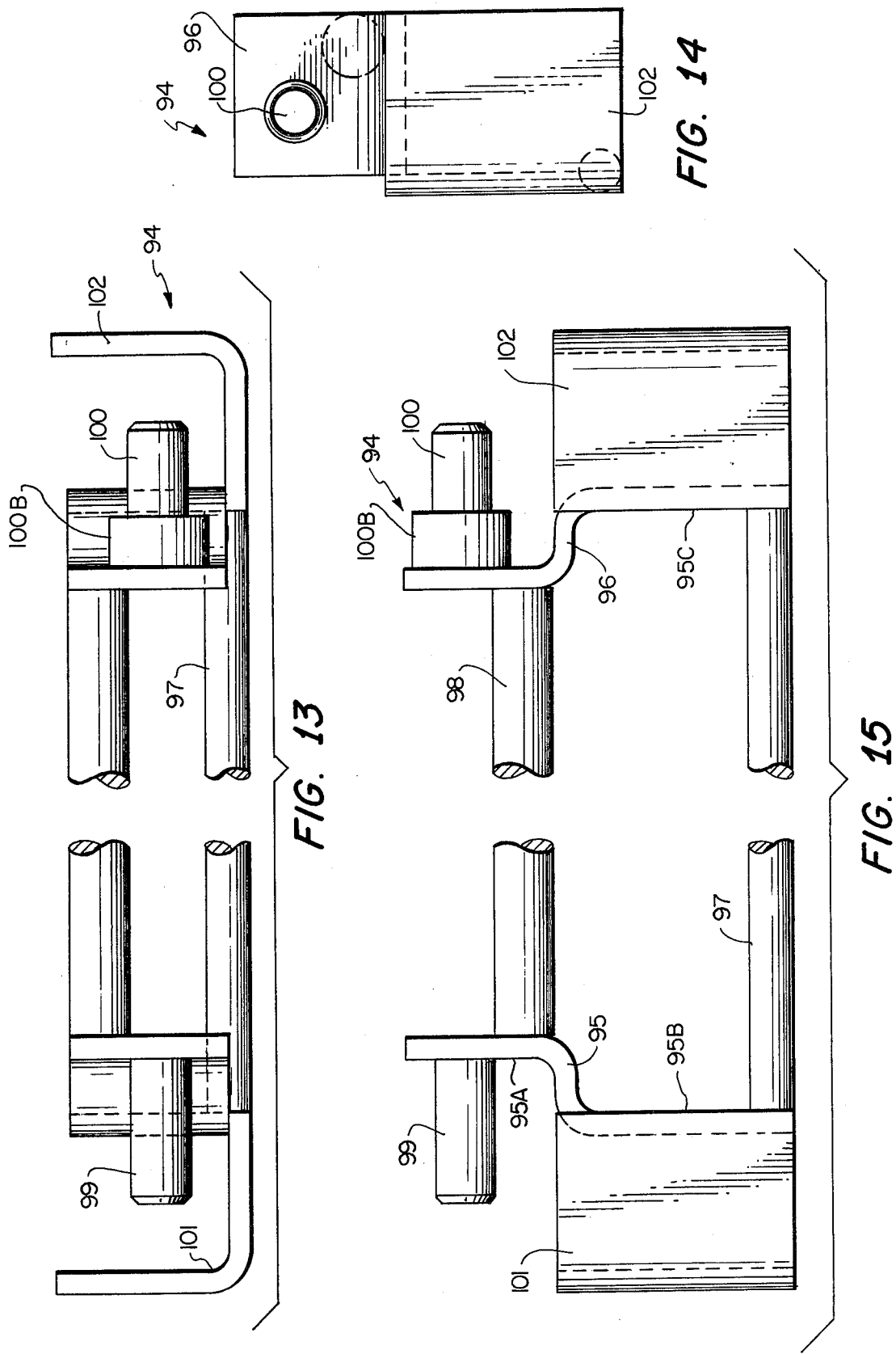

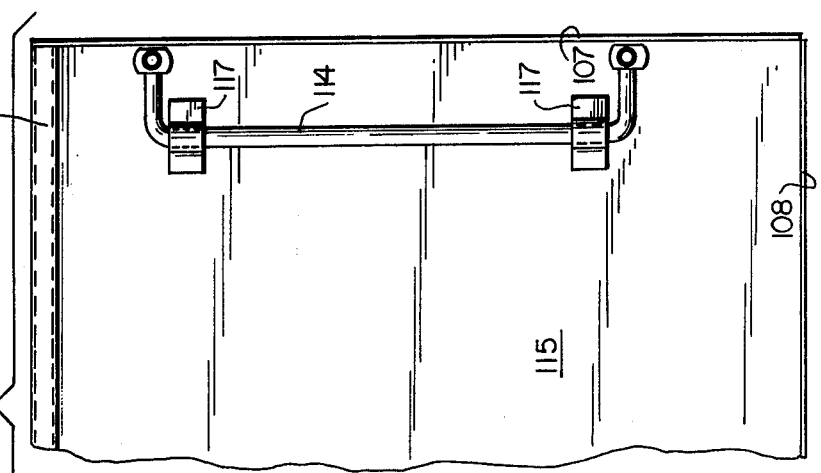
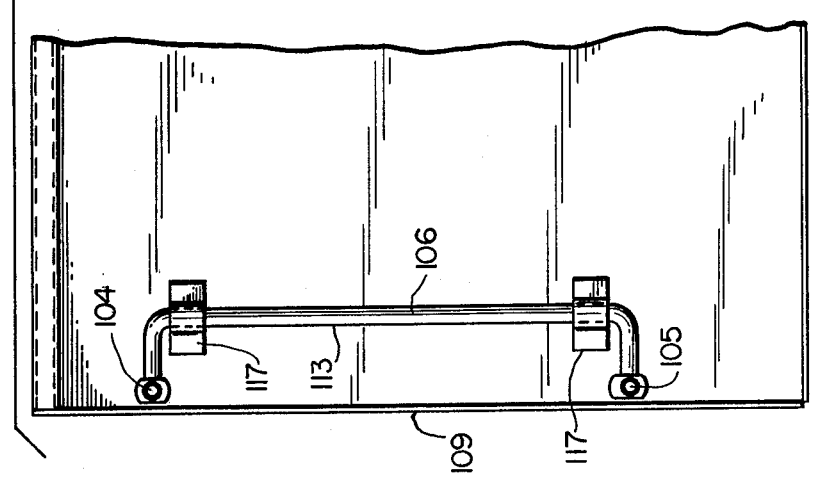
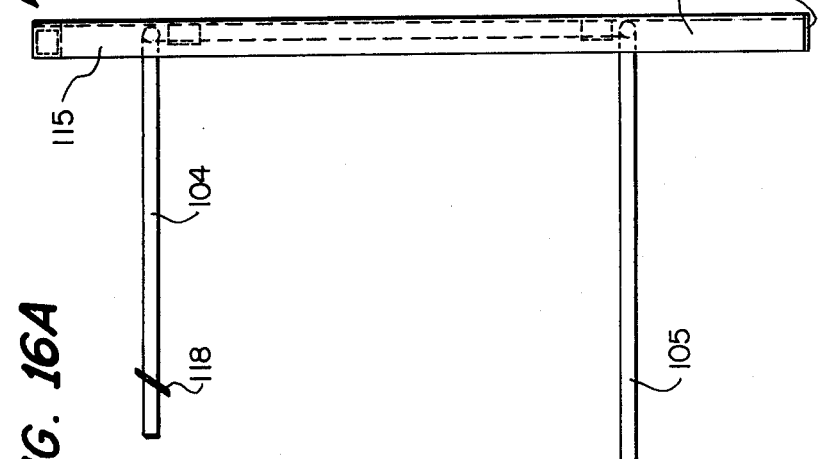

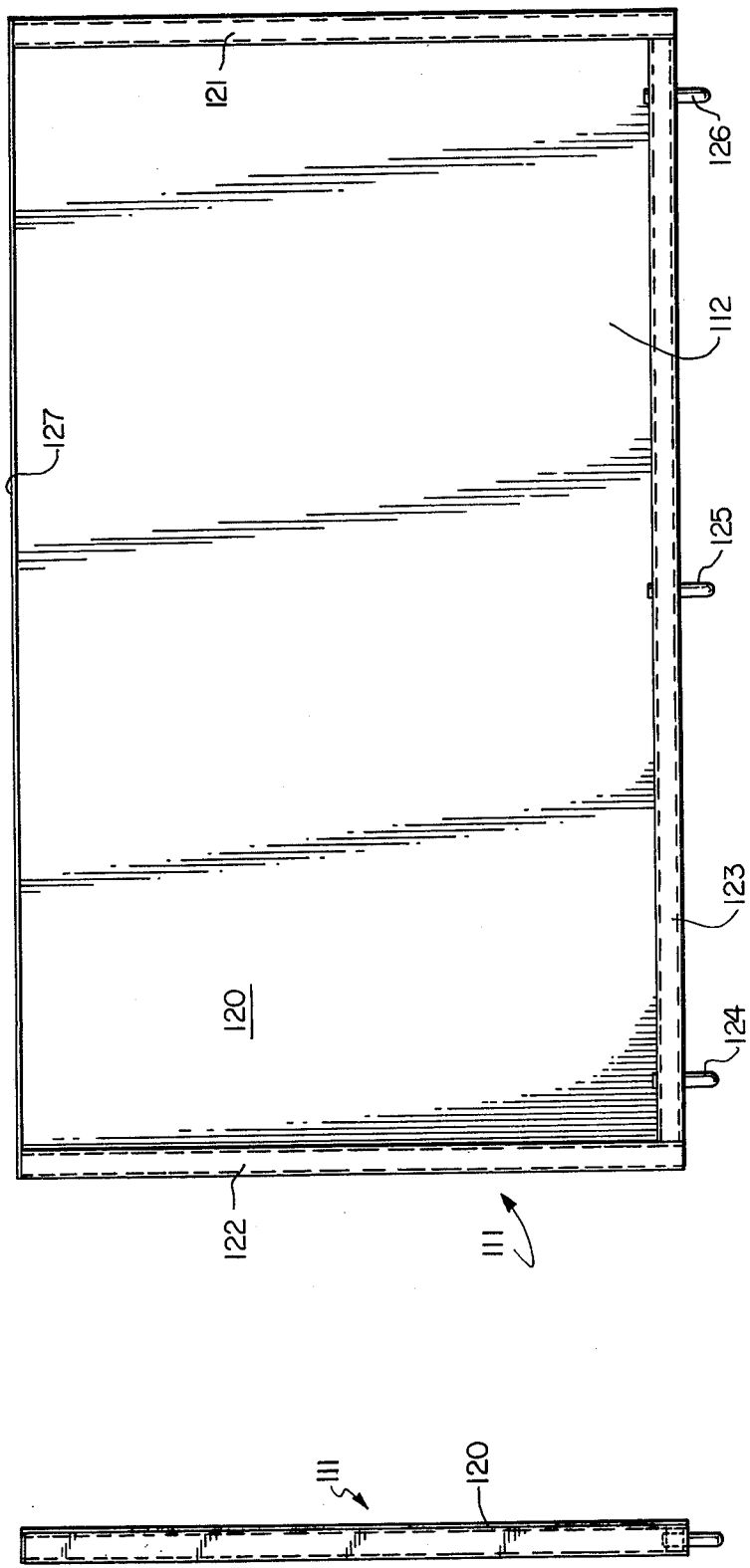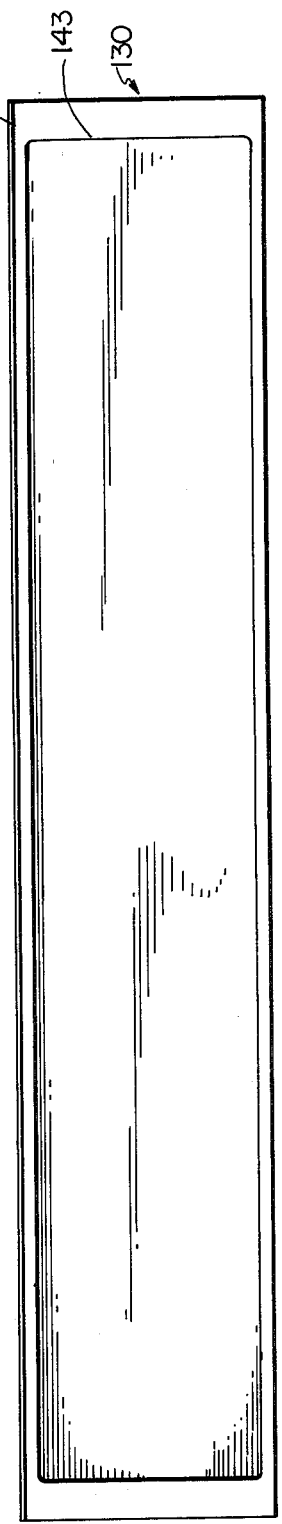
FIG. 22
FIG. 26
FIG. 21

PORTABLE DISPLAY VEHICLE

This is a continuation of application Ser. No. 491,070, filed July 23, 1974, now abandoned.

This invention relates to a portable display vehicle, and, more particularly to a cart which may be loaded with displayable products, such as cartons of soft drink bottles, moved to another location and displayed at the other location, all without the necessity for rehandling the displayable product a second time.

The physical distribution of goods from the point of production to the point of consumption in a streamlined fashion is becoming increasingly important in various industries, such as in the production and sale of soft drinks, beer, milk, etc. One type of distribution which has been used in the past is to simply load cartons of the product on a truck at the point of production, deliver them to the store, and then unload the carton, such as by the use of a two wheel or four wheel hand truck. It is then necessary to take them either to a storage area in the store or to place them directly on the shelves of the store. This system of delivery is undesirable due to both the amount of time required to accomplish the delivery and because of the investment necessary in equipment.

Another system for distributing goods from the point of production to the point of consumption is the bulk delivery system. With bulk delivery, cartons of product are loaded onto bulk delivery carts at the production site, e.g., a bottling plant, or at a warehouse. The carts are designed to protect the product while in transit, such as by the use of special reinforcing used in the construction of the cart. Such a bulk delivery cart is loaded along with a number of other such carts onto a truck. At the outlet site, the carts are wheeled from the vehicle to the storage area or directly to the beverage shelves where they are again unloaded. These bulk delivery carts are not suitable for displaying the product at a store.

Some retail outlets have loaded the product onto a movable product display type cart in the storage area of the outlet. The carts are then wheeled directly to the beverage department where they serve as part of the beverage section. However, such carts are not suitable for hauling products, such as cartons of bottles over long distances since the products tend to bounce out of the cart and the carts cannot endure prolonged use in being transported in bulk delivery vehicles, such as a truck.

It is an object of this invention to provide a portable display cart which may be loaded at the point of production or at the warehouse, transported over the road in bulk delivery vehicles, such as a truck, delivered to the outlet and used in the appropriate department of the outlet as an attractive display for the product.

It is a further object of this invention to provide such a cart which will avoid the necessity for anyone to handle the product other than the personnel at the bottling plant or the warehouse.

It is still another object of this invention to provide such a display cart which will secure and protect the product while in transit and which will be easy to maneuver at all points from the bottling plant to the retail outlet and which will be attractive and convenient to the consumer when used in the product section of the outlet.

Briefly, the objects of this invention are attained by providing a portable display vehicle which is useful for transporting, storing and displaying food, beverage and other displayable products. The vehicle comprises a base member having a rear edge and including a plurality of casters attached to the underside thereof for supporting the vehicle in an upright and stable condition. Sidewalls are attached in a vertical position to the sides of the base member. Between the sidewalls there is an L-shaped product support member comprising a back wall attached to a bottom shelf in such a way that the bottom shelf slopes downwardly toward the rear edge of the base member. The sidewalls and the product support member thereby form an open volume for containing the displayed products. The vehicle may also be provided with a flexible product retainer adapted to go over the open top portion of the vehicle and secure the product therein during transport, two or three swivel casters, one or two combination fixed and swivel casters, each fixed and swivel caster having associated therewith a spring loaded lock pin assembly for locking said caster and means for disengaging the lock pin assembly.

The invention will be more fully described by reference to the following drawings, which form part of the specification, and wherein like identifying members apply to like parts wherever they occur:

FIG. 7 is a side elevational view of the loaded vehicle showing the retaining cover in place;

FIG. 8 is a perspective view of another embodiment of the vehicle showing an upper shelf, an upper shelf back and a lower extension shelf in place;

FIG. 9 is a side elevational view taken substantially along lines 9—9 of FIG. 4, except that a portion of the member through which the section is taken is shown, and showing the cable for remotely unlocking the pivotal casters;

FIGS. 13 to 15 are top elevational, side elevational and front elevational views, respectively, of the retaining cover hold-down handle as viewed from the front of the display cart;

FIG. 16 is a side view showing the upper fastening pocket of the flexible retaining cover;

FIG. 16A is a side view of an alternate means of fastening the retaining cover;

FIG. 18 is a side view showing the pocket formed in the lower end of the flexible retaining cover;

FIGS. 19 and 20 are side elevational and bottom plan views of the upper shelf respectively;

FIGS. 21 and 22 are side elevational and bottom plan views of the upper shelf back support;

FIG. 26 is a plan view of the surface member of the lower extension shelf;

Figure 2:
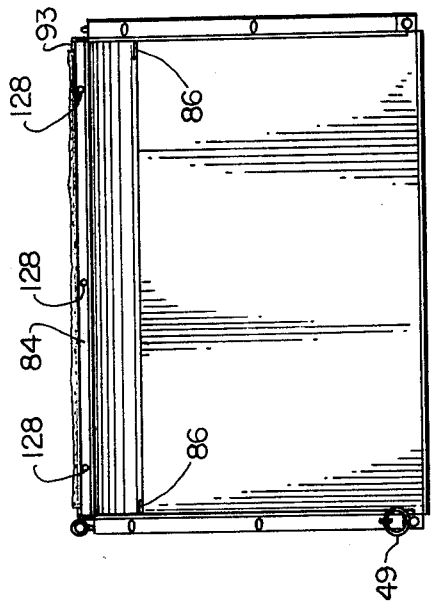
FIG. 2 is a top view of the vehicle.

Referring to the drawings in detail, FIGS. 1-5 of the drawings show a vehicle for transporting, storing and displaying food, beverages and other displayable products, henceforth referred to as the display vehicle designated generally as 10. The display vehicle 10 is comprised of a base member 11, sidewalls 12 and 13 and an L-shaped product support member 14.

Figure 3:
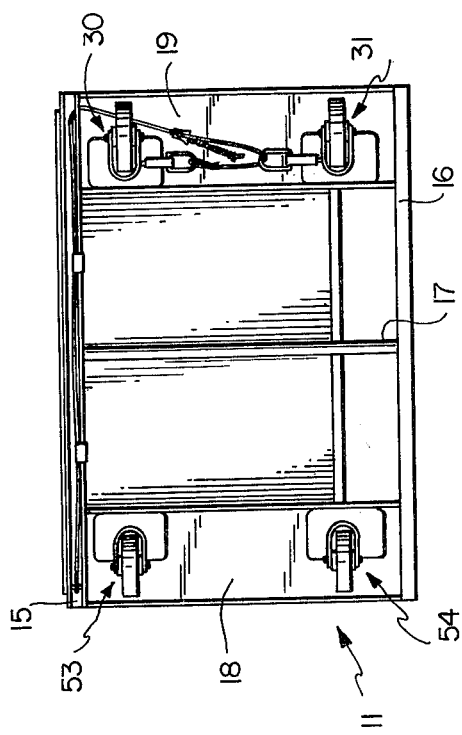
FIG. 3 is a bottom view of the vehicle showing the base member with two pivoting casters and means for locking both casters.

Base member 11, as best shown in FIG. 3, includes a front base frame 15, a rear base frame 16 and a middle base frame 17; the items 15, 16 and 17 being constructed from square extruded or fabricated tubing. In addition, base member 11 includes left end channel and caster assembly 18 and right end channel and caster assembly 19 to be described in further detail hereinafter.

Front base frame 15, rear base frame 16, middle base frame 17, left end channel and caster assembly 18, and right end channel and caster assembly 19 are welded or otherwise fastened together to form a rigid and generally rectangular shaped base supporting member shown generally as base member 11 in an inverted position in FIG. 3.

Figure 11:
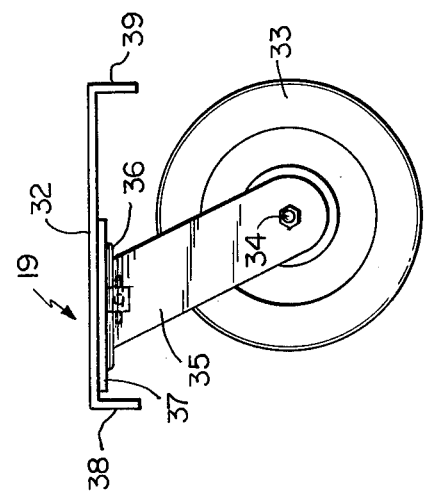
FIG. 11 is a side view of a combination fixed and swivel caster.
Figure 10:
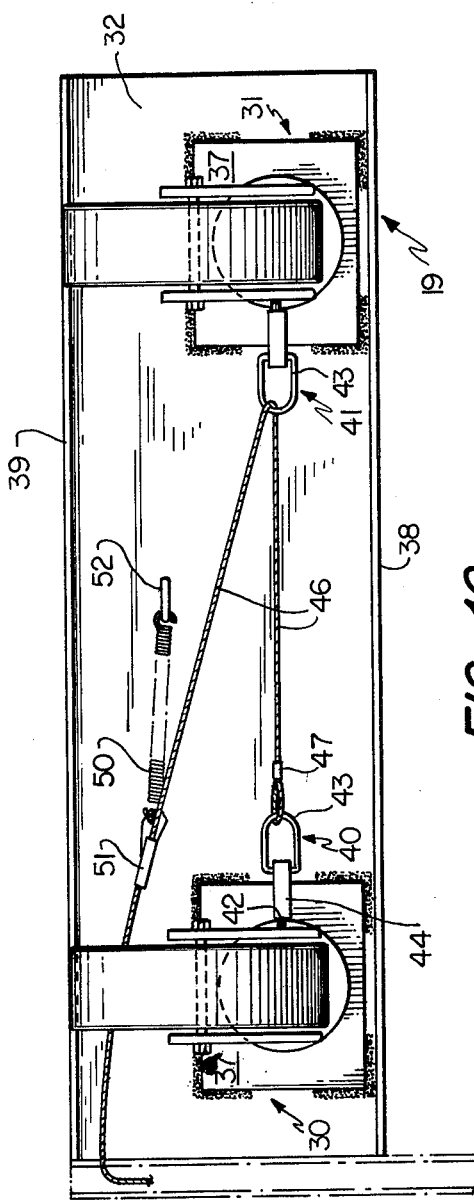
FIG. 10 is a view of a section of the bottom of the vehicle showing two combination fixed and swivel casters.
Figure 12:
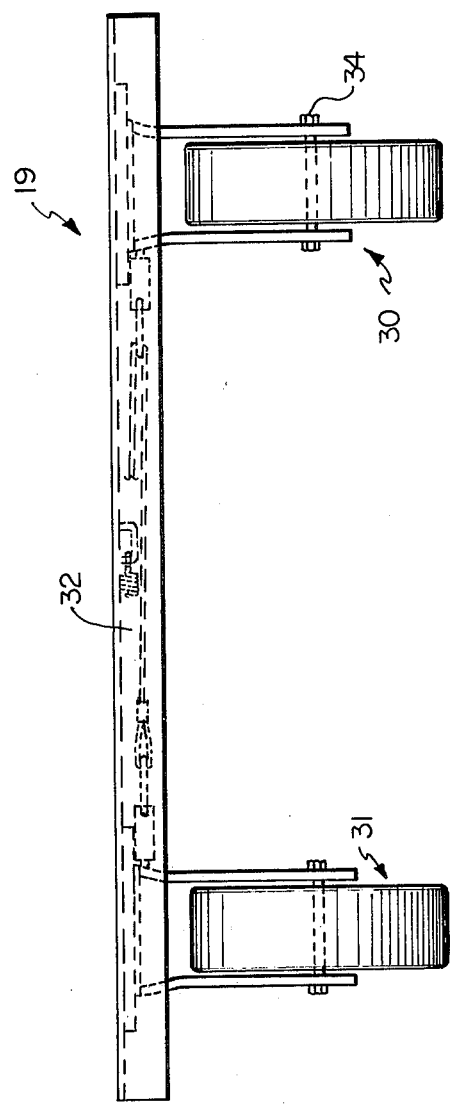
FIG. 12 is a side elevational view of the section of the cart shown in FIG. 10.

Referring now to FIGS. 10-12, there is shown the construction details of the right end channel and caster assembly shown generally as 19. The assembly 19 is comprised of front caster 30, rear caster 31, and channel support member 32. Each caster 30 and 31 includes a wheel 33, an axle 34, a support bracket 35, a pivot support bearing 36 and a mounting base 37.

Channel support 32 is fabricated from sheet metal by bending downwardly the left and right-hand edges to form reinforcing edges 38 and 39. Casters 30 and 31 are secured to the base of the channel support 32 and within edges 38 and 39, such as by welding the mounting base 37 of casters 30 and 31 thereto.

Each of the casters 30 and 31, which is sometimes referred to herein as combination fixed and swivel casters, includes locking device means 40 and 41 for locking the pivot support bearing 36 to prevent rotation of the support bracket 35. Each locking device means 40 and 41 includes a locking pin 42, one end of which is secured to ring 43 and the other end of which presses against the pivot support bearing 36. The locking pin 42 is secured in place by means of supporting block 44. The supporting block 44 is secured to the mounting base 37 and contains a longitudinal bore in which the locking pin 42 is situated. The ring 43 which is secured to one end of the locking pin 42 is free to move within a slot located in the end of the supporting block 44 in the same plane as the bore of the supporting block 44. A spring is located between the end of the locking pin 42 which is attached to ring 43 and the end of the supporting block 44. The compressive force of this spring normally forces the locking pin in the direction of and against the pivot support bearing 36. There is at least one indentation on the pivot support bearing 36 which, when in registration with the end of the locking pin 42, causes the caster to be locked in place — i.e., so that it will not be free to swivel.

U.S. Pat. No. 2,154,525, the disclosure of which is incorporated herein by reference, shows casters with locking means for preventing a caster from swiveling, such as may be used in the practice of this invention.

A cable 46 passes through the ring 43 attached to the locking pin on caster 31 and is secured to ring 43 on the locking pin of caster 30 by means of a loop formed in the end of the cable 46 and fastened with a clamp 47. Thus, when tension is exerted on the other end of the cable 46, the two rings 43 in the ends of the locking pins 42 are caused to move toward each other, thereby pulling the locking pins in a direction away from engagement with the pivot support members 36 and causing the springs contained in the supporting blocks 44 to be compressed. Thus, cable 46 simultaneously operates both locking devices 40 and 41 which secure front and rear casters 30 and 31 from pivotal rotation, thus permitting the casters to pivotally rotate. The actuation of the cable which unlocks the locking devices 40 and 41 is accomplished manually from a remote location as hereinafter described.

A spring 50 is attached to the channel support member 32 by means of a loop 52 at one end and is attached to the cable 46 by means of clamp 51 at the other end. This spring is used to tighten the section of a cable attached to an operating ring 49, hereinafter described, and to loosen the portion of the cable attached to rings 43 when not in use — i.e., when the manual remote unlocking device is not operated.

The cable 46 travels diagonally across channel support member 32 into the U-shaped channel of the base frame 15, best shown in FIG. 3, along this channel to the opposite end thereof, and then travels upwardly to the supporting member of sidewall 13 and is finally attached to a manual operating ring 49. FIG. 9 shows the path of the cable 46 from the base member 11 to the manual operating ring 49. Cable 46 passes through opening 24 in front base frame 15 into front vertical frame 60 in which it travels vertically. Near the top of front vertical frame 60, the cable emerges through opening 25 and then goes through opening 26 in the bottom portion of upper slant frame 62 and emerges through opening 27 in the top part of upper slant frame 62. The end of the cable 46 is attached to the ring 49 by forming a loop in the end of the cable into which the ring 49 is inserted. The end of the cable is secured to itself by means of a clamp 28.

Referring again to FIG. 3, it will be seen that the right-hand casters 30 and 31 are steerable and contain locking mechanisms 40 and 41 previously described to permit or prevent pivotal rotation as required. Casters 53 and 54 secured to the left channel and caster assembly 18 and to the underside of base member shown generally as 11, are swivel casters which do not have means for locking them to prevent them from pivoting. In all other respects the left-hand channel and caster assembly is identical to the right-hand channel and caster assembly.

Figure 27:
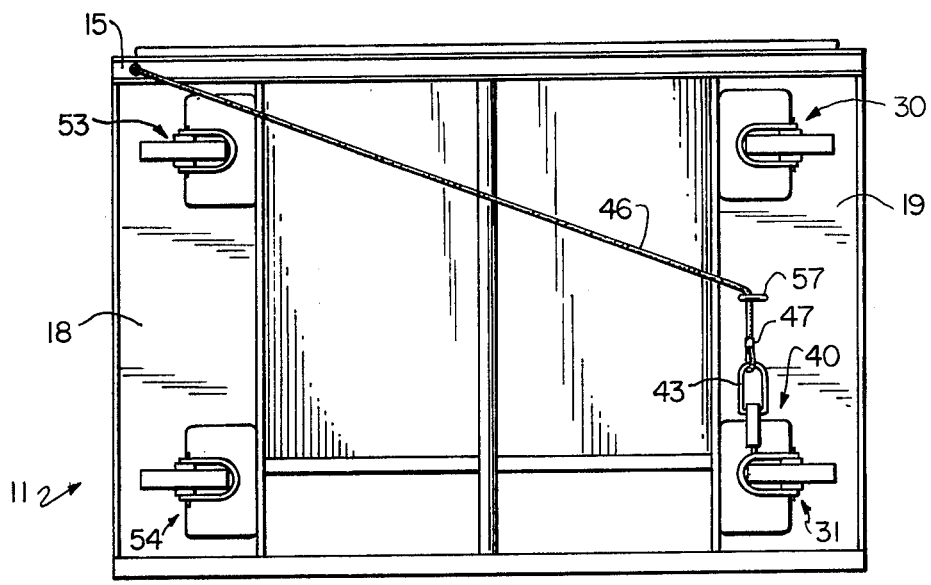
FIG. 27 is a bottom view of the vehicle showing an alternate embodiment of the pivoting caster assembly wherein only one pivoting caster is locked.

In accordance with another embodiment of this invention as shown in FIG. 27, the display vehicle may also be secured in its resting position by locking only a single one of the two pivoting casters. In this embodiment, it will be seen that cable 46 is routed through loop 57 which is secured to channel support member 32, where it is fastened to locking means 40 by securing the cable to ring 43 by means of clamp 47 as previously described. This embodiment reduces the possibilities of a malfunction of the locking mechanism. In this embodiment, cable 46 passes diagonally across the bottom of the cart, through a passageway, not shown, in member 18 and vertically up the side of the display cart through a passageway, not shown, in member 62 where it is attached to ring 49.

When the display vehicle is not being moved on its wheels — i.e., when it is stationary as during the time it is being transported on the bed of the truck or during loading or display and, when it is being moved on its wheels, such as when it is being loaded onto a truck or rolled from the truck to the display area, the combination fixed and swivel caster or casters are locked in a fixed position lengthwise with the cart. The other swivel casters permit easy steering of the cart. The fixed caster rotates only in a plane parallel to the sides of the vehicle and thereby facilitates the accurate control of its direction when it is being pushed from the opposite end.

When it is desired to position the cart in the display area, it is necessary to have all four casters free to swivel since the cart must be pushed into the display section in a direction perpendicular to the length of the cart or at right angles to the fixed position of the combination fixed and swivel caster or casters. This is accomplished by pulling the ring 49 causing the locking pin 42 to disengage from the caster. Thus, as long as the ring is pulled unlocking the caster, the cart can be moved to its proper position parallel with the beverage section or in any other direction. Obviously, it may be desirable to unlock the casters at some other time when the display vehicle is being moved to enhance its maneuverability.

Figure 4:
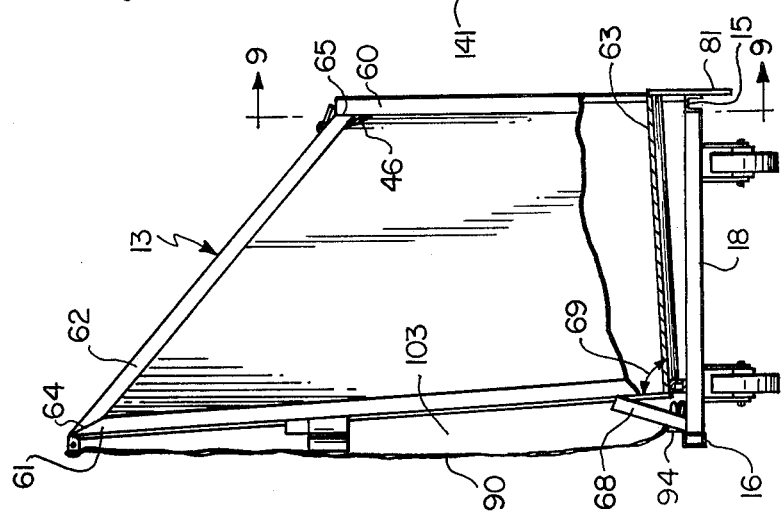
FIG. 4 is a side elevational view of the vehicle showing the retainer cover in a stored position and a cutaway side panel to reveal the L-shaped product support member.
Figure 17:
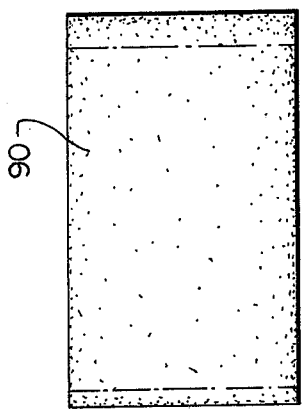
FIG. 17 is a plan view of the flexible retaining cover.

The left sidewall shown generally as 13 in FIG. 4 is comprised of a front vertical frame 60, a back outer frame 61, an upper slant frame 62, and a lower inclined frame 63. Each of frames 60, 61, 62 and 63 are fabricated or extruded tubular members with a square cross-section. As shown at joints 64 and 65, which are formed by the intersection of members 61-62 and 62-60, respectively, the ends of each of the members are properly shaped so that the abutting faces may be welded or fastened by other suitable means.

The left side panel 13 is secured to the base member shown generally as 11. Reinforcing bar 68 is attached at its lower end to the point at which rear base frame 16 and left end channel and caster assembly 18 join and, at its upper end, the reinforcing bar 68 is secured to the back outer frame 61. The purpose of the reinforcing bar 68 is to increase the rigidity of the structure between left side wall 13 and base member 11 and to eliminate protruding corners from base member 11.

The back outer frame 61 is tilted backwardly so that the angle formed with respect to the left channel and caster assembly 18 is greater than 90°. Lower inclined frame member 63 which is fastened securely to back outer frame 61 and left front vertical frame 60, is also inclined at a slight angle — e.g., about 5½° — with respect to the base member 11. In the preferred embodiment, the angle 69 formed at the intersection of back outer frame 61 and lower inclined frame 63 is substantially 90°.

Figure 1:
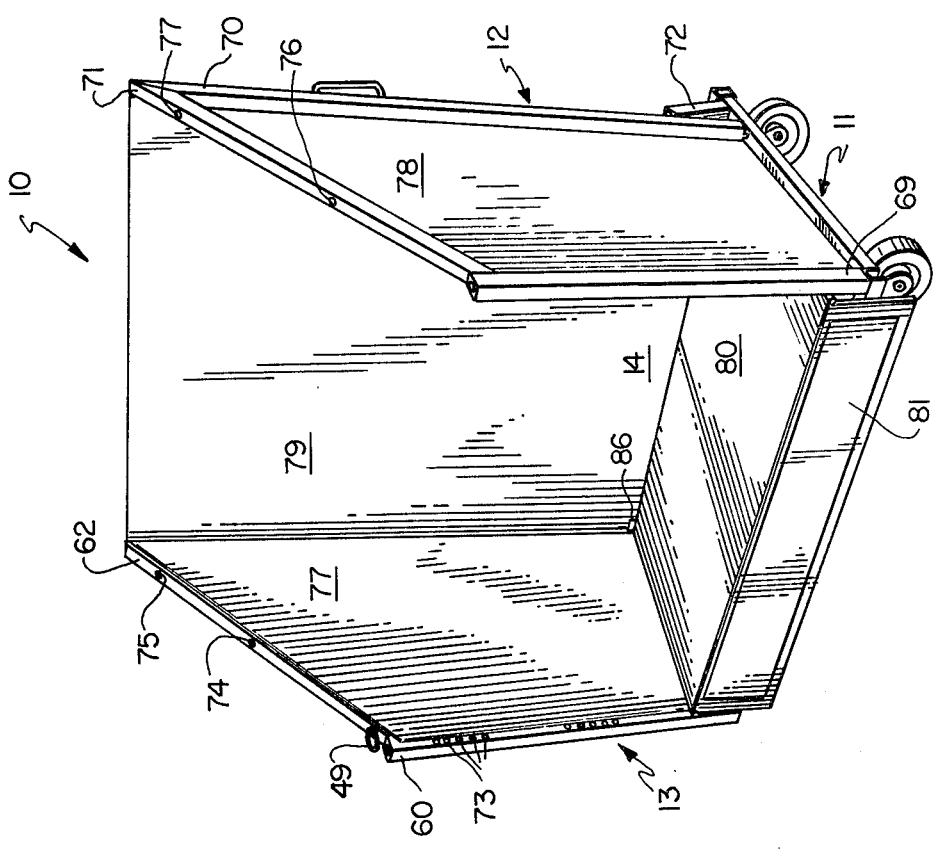
FIG. 1 is a perspective view of the transport, storage and merchandising vehicle embodying the present invention.

A comparison of the perspective view of the right-hand side of the display vehicle as shown in FIG. 1 with the fragmentary vertical elevation view of FIG. 4 will show that the sidewall 12 is a mirror image of sidewall 13 but otherwise is substantially identical as to the method of construction. The members indicated as 69, 70, 71 and 72, respectively, in FIG. 1 correspond to items 60, 61, 62 and 68 on the other side of the vehicle 10. The lower inclined frame of the right-hand side which corresponds to lower inclined frame 63 of the left-hand side is not shown.

A series of holes 73 is provided in front left vertical frame member 60 as shown in FIG. 1. Holes 73 are for use with the retaining cover to be described hereinafter. Similar holes not shown are provided in front right vertical frame member 69 and are used for the same purpose as holes 73.

Holes 74 and 75 and holes 76 and 77 are provided in left upper slant frame 62 and right upper slant frame 71, respectively. These holes are provided for use with the supporting brackets of the upper shelf to be described hereinafter.

The interior surface of the display vehicle 10 is comprised of left sidewall skin member 77, right sidewall skin member 78, back wall skin member 79 and lower shelf 80. Skin member 77 is attached by suitable means to front left vertical frame 60, back outer frame 61, upper slant frame 62, and lower inclined frame 63. Right-hand sidewall skin member 78 is attached to the front right vertical frame 69, the back outer frame 70, the upper slant frame 71, and the lower inclined frame 72. Back wall skin member 79 is attached to back left outer frame 61, back right outer frame 70, upper horizontal support member 84, and fastened by suitable means to the rear edge of lower shelf 80. The upper horizontal support member 84 is secured to the tops of frames 61 and 70. The back 79 may contain holes 86 in the bottom thereof to permit the drainage of water, spilled beverages, etc. The lower shelf 80 and display panel 81 are formed of a single sheet of metal by bending the edge down. The lower shelf 80 rests on and is secured to lower inclined frame 63 on one side and the lower inclined frame on the right side which is not shown. The back of the lower shelf 80 is supported by the various members making up the base member 11. The front portion of the display panel 81 shields the casters and caster release system from the eyes of customers when the vehicle is in position in a display area. Moreover, display panel 81 provides a suitable space for displaying product identification and, when recessed as shown, provides a natural protection for the display space.

Flexible retaining cover 90 shown in FIGS. 4, 6, 7, 16, 17 and 18 is employed to secure the beverages or other products in the display vehicle 10 while the vehicle and product therein are being transported from one area to another. The flexible retaining sheet is fabricated from flexible resilient material, such as rubber, commonly called elastomeric material, with characteristics that will make it elastic, strong, and durable. As shown in FIGS. 16 and 18, pockets 88 and 89 are formed in each end of the retaining cover by forming a loop and securing the material to itself by a suitable process such as sewing with thread at 91 and 92, respectively.

Retaining cover 90 is held at its upper end with an upper holding bar 93 as shown in FIGS. 2 and 16. The holding bar is attached to the display vehicle 10 by removable fasteners, such as screws which are threaded into the back outer support frames 61 and 70 at the end of holding bar 93. The midpoint of the holding bar 93 is also attached by means of screws to the upper horizontal support 80 at its midpoint.

Figure 6:
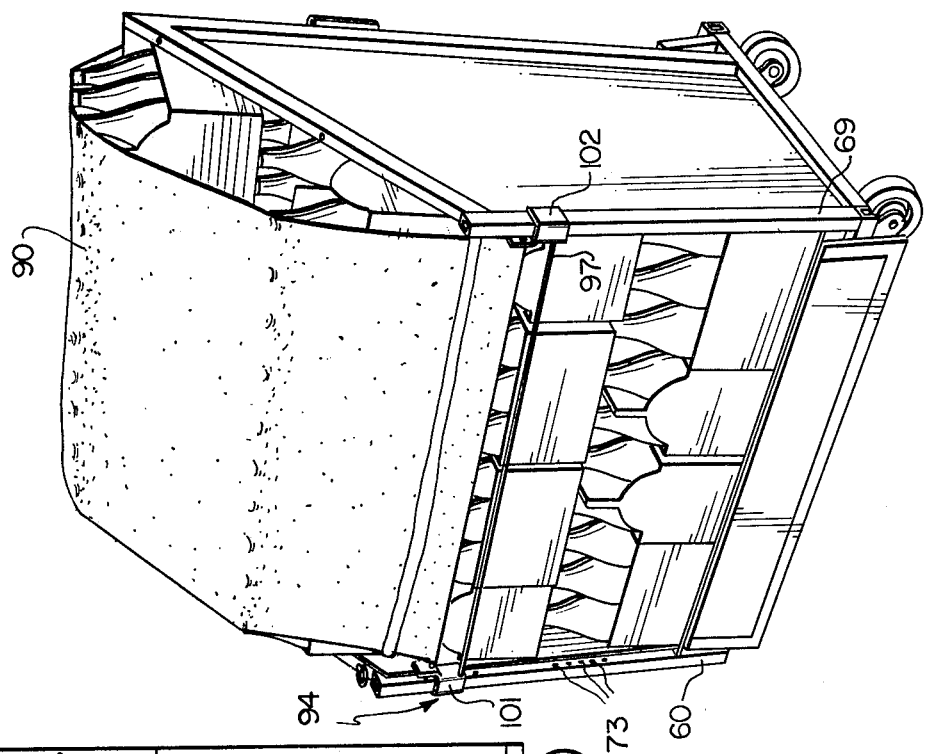
FIG. 6 is a perspective view of the vehicle loaded with cartons with the retaining cover in place and the vehicle ready for transporting products.
Figure 5:
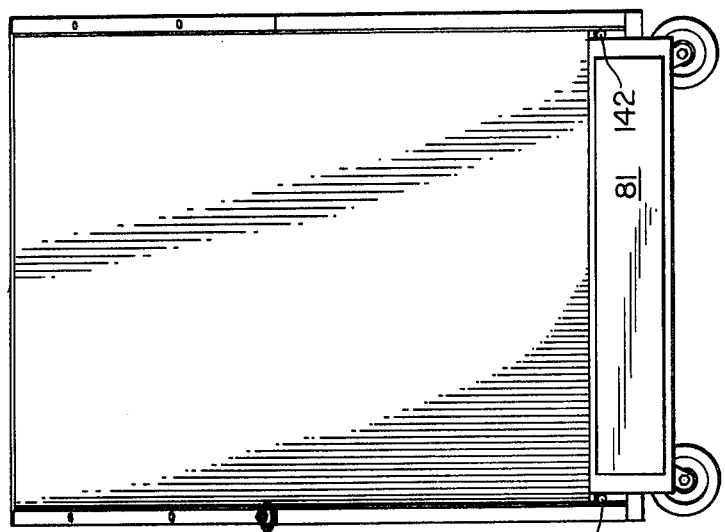
FIG. 5 is a front elevational view of the vehicle.

Flexible retaining cover 90 is held at its lower end by means of a cover hold-down device 94 which is shown in place in FIG. 6. In FIGS. 13–15 are shown details of the hold-down device 94 which is comprised of left and right-hand Z-shaped brackets 95 and 96 to which is attached handle 97, flexible retaining cover hold-down rod 98, and pivot pins 99 and 100 and depth stop washer 100B. Handle 97, constructed from extruded or fabricated tubing, is attached to one end of the inner surface of left-hand Z-shaped bracket 95 and at the other end to the inner surface of Z-shaped bracket 96. At the opposite end of Z-shaped bracket 95 and attached to the outer surface is pivot pin 99. In a similar manner, pivot pin 100 is attached to the end of the Z-shaped bracket 96 at the end opposite handle 97. Depth stop washer 100B is attached to pivot pin 100.

It will be noted that the hold-down rod 98, which is inserted into the lower pocket 89 of the flexible retaining cover as shown in FIG. 18, is attached to the inner surface of Z-shaped brackets 95 and 96 at the same end with the pivot pins. The center line of cover hold-down rod 98, however, is different than the center line — i.e., point of rotation, of pivot pins 99 and 100. The object of this difference in the center lines of the pivot pins 99 and 100 from hold-down rod 98 will be obvious from the description of the use of the cover hold-down device to follow.

In FIG. 4, the hold-down device 94 is shown in the storage position resting on base member 10 and generally between reinforcing brackets 68 and 72. When flexible retaining cover 90 and the cover hold-down device 94 are moved from the storage location to the position for retaining the beverage containers in the display vehicle as shown in FIG. 6, pivot pins 99 and 100 of hold-down device 94 are inserted into one of the holes 73 in each of the left and right vertical frame members 60 and 69. When the hold-down device 94, with the retaining cover 90, is initially positioned with pivot pins 99 and 100 inserted into their mating holes 73 of the sidewalls, handle 97 and hold-down rod 98 will be located above pivot pins 99 and 100. With the handle in this position, cover 90 which is made of flexible and elastic material, will be in a relaxed loose condition. Handle 97 may then be rotated in an arc, with the center of the arc formed by pivot pins 99 and 100 so that the handle rotates from the upper position to the lower position as shown at rest in FIG. 6. Hold-down rod 98 which is also offset from pivot pins 99 and 100 will swing in a somewhat smaller arc as the handle is moved from the upper position to a lower position, thus tightening the flexible retaining cover 90 over the cartons contained in the display vehicle 10. The cover 90 will then be taut over the bottles and will help to hold secure the contents of the display vehicle 10 when it is being moved, carried on a truck, etc.

The plurality of holes 73 in left and right front vertical frames 60 and 69 are for adjusting the position of the cover hold-down device 94 to allow for various product loads carried by the display vehicle 10.

U-shaped clamps 101 and 102 are attached to the edge surfaces of Z-shaped brackets 95 and 96, as shown in FIGS. 6 and 13–15, for the purpose of holding the hold-down device 94 in position once handle 97 has been rotated into its secure position. These clamps frictionally engage front vertical frames 60 and 69.

Cover hold-down device 94, which tightens and holds the retaining cover 90 over the product, is inserted into its holding position at the front of the car as follows: the hold-down device 94 is tilted at a slight angle and pin 99 inserted into one of holes 73. With Z-shaped bracket 95 in the horizontal position, the inner face 95A to which pin 99 is attached will abut the inner surface of left front vertical frame member 60. With the hold-down assembly in this position, pin 100 may be inserted into one of the holes in the right front vertical frame member 69 as far as the depth stop washer 100B will permit and centered horizontally between left and right vertical frame members 60 and 69. With the hold-down device 94 centered between the vertical frame members 60 and 69, handle 97 may be rotated about pins 99 and 100 to its lower position. In this position the outer surfaces 95B and 95C of left and right Z-brackets 95 and 96 contact the inner surfaces of vertical frame members 60 and 69 thereby positively centering assembly 94 and preventing it from becoming disengaged until the hold-down device is again rotated to the upper position.

The retaining cover 90 may also be secured to the handle 97 in which case a greater cam action is attained and, therefore, greater tightening of the cover.

Instead of being sewn to the rod 98 or handle 97, the cover 90 may be secured by means of a holding bar 162 as shown in FIG. 16A. In this embodiment, it is preferred that the rod 164 to which the cover 90 is secured, which may replace either rod 98 or handle 97, be a tubular member having a square cross section. The cover 90 is wrapped around the holding bar 162 and the holding bar 162 and cover 90 are then secured to the bar 164 by means of screw 168 and washer 166.

When the hold-down device 94 is in place, it helps prevent any product from falling out of the front of the cart.

Figure 28:
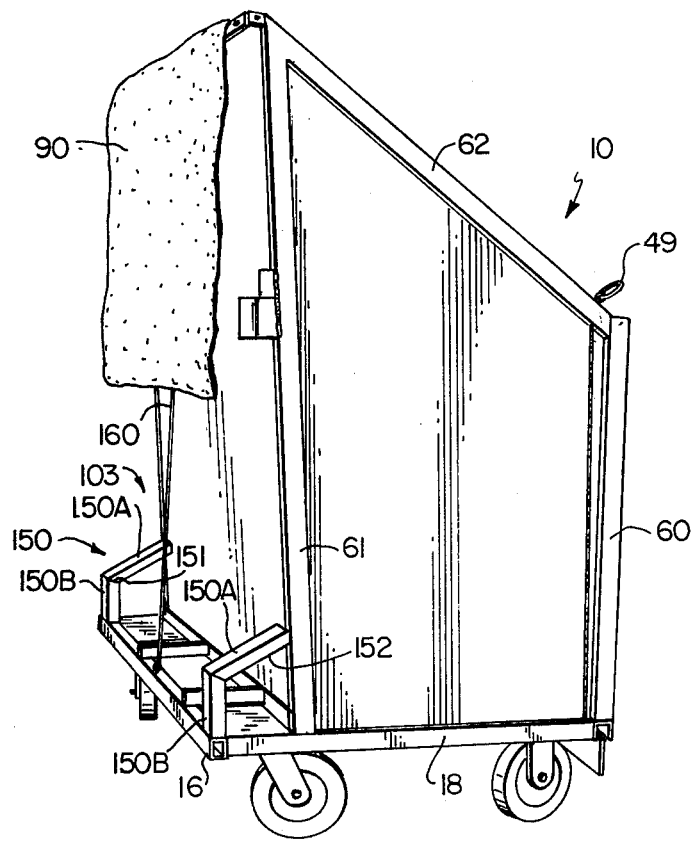
FIG. 28 is a rear perspective view of the vehicle and shows a different embodiment of the reinforcing brace.

The L-shaped product support member 14 is comprised of lower shelf 80 fastened at approximately a right angle to the back wall skin member 79, as shown in FIGS. 1 and 4 and is tilted as a unit, e.g., at an angle of about 5° from the vertical, thereby forming a storage area indicated as 103 in FIGS. 4 and 28 completely within the limits of the dimensions formed by the outer surfaces of the display cart 10. This storage space 103 is used advantageously to store the retaining cover 90 when not in use. The combination of the retaining cover 90 pulled tightly over the product contained in the vehicle in combination with the permanent tilt of the L-shaped product support member insures that virtually any type of product which is loaded in the vehicle will be securely held during transit of the vehicle from one place to another. The display vehicle may be loaded onto a bed of a truck, transported to the retail outlet and then moved into the display area as previously described. The cover hold-on device 94 is then unfastened and it and the retaining cover 90 are placed in the storage compartment 103. The product is then fully exposed and is ready for display.

A second embodiment of the display vehicle 10 is shown in FIG. 8 which includes an upper shelf 110, an upper shelf back 111, and a lower extension shelf 112. These three items 110–112 are for the purposes of adding to the display capacity of the display vehicle 10 but they would not normally be used in transporting a product from one area to another. Both the upper shelf 110 and the lower extension shelf 112 are foldable, as hereinafter described and in their folded position can be inserted together with the upper shelf back 111 into the storage space 103 provided at the rear of the display vehicle.

Upper shelf 110 as best seen in FIGS. 19 and 20 comprises right and left-hand support members 113 and 114, shelf support surface 115, back frame member 116, four identical hinge clamps 117 and four identical support stop members 118. Each support member 113 and 114 includes a short leg 104 and a long leg 105 which extend perpendicular from the U-shaped base rod 106. Shelf support surface 115 which is generally rectangular in shape, is fabricated from sheet metal or similar material and has its two shorter sides and front edge bent downwardly to form small lips 107-109 for reinforcing the sheet metal structure.

The rearward edge of the shelf surface 115 is reinforced with an extruded or fabricated tubular reinforcing frame member 116 having a square cross-section. The reinforcing frame member 116 is attached to the shelf surface 115 at its rearward edge by welding or other suitable means.

Right and left support members 113 and 114 are fabricated from solid rod bent in a U-shaped configuration and having one leg 104 substantially shorter than the other leg 105. The base portion 106 of U-shaped support members 113 and 114 are bent at right angles to form a hingeable section which are attached to shelf support surface 115 by means of four hinge clamps 117. The hinge clamps 117 are attached to the shelf surface 115 by welding or other suitable means. It will be understood that left-hand support 114 is a mirror image of right-hand support 113, being in all other respects identical however.

Stops 118 are welded or otherwise secured near the end of each of the legs 104 and 105. When it is desired to increase the display capacity of the display vehicle 10, upper shelf 110 is installed by inserting the lower extremities of short legs 104 into holes 75 and 77 of the upper slant frames and the lower extensions of long legs 105 into holes 74 and 76 of the upper slant frames. With the legs 104 and 105 properly positioned, the stop plates 118 come to rest on slant frame members 62 and 71, securing the upper shelf 110, as best shown in FIG. 8, in a stable rigid position with the shelf support surface 115 in a horizontal position.

Upper shelf back 111 is installed on top of display vehicle 10 and behind upper shelf 110 to prevent additional quantities of display product which are carried on the upper shelf 110 from being displaced rearwardly, thus falling off the rear shelf edge. Upper shelf back 111 can be used without upper shelf 110 to support additional quantities of product displayed above the back wall of the L-shaped product support member.

FIGS. 21 and 22 show the fabrication and construction details for the upper shelf back 111. Shelf back 111 is comprised of a surface member 120, left side reinforcement member 121, right side reinforcement member 122, and bottom reinforcement member 123 which contains three locating pins 124, 125 and 126 for securing the shelf back 111 to the upper surface of the display cart 10. Surface member 120 is fabricated from sheet metal by bending a small lip 127 lengthwise and rearwardly of the support surface as viewed from the front of the display cart. The left and right-hand edges of the surface member 120 are reinforced with tubular members having a square cross-section, items 121 and 122. The bottom edge of the surface member 120 is reinforced in a similar manner with a box-like tubular structure 123. Reinforcing members 121, 122 and 123 are welded to each other at the corners and to the surface member 120. Two holes are located adjacent the ends of the bottom reinforcement 123 and a third hole is centered midway between the other two. Into these holes are inserted three pins 124-126 which are secured to the reinforcement 123 by riveting or welding. The pins extend beyond the limits of the surface member 120 but are contained within a plane parallel to the surface member.

Whenever the upper shelf 110 is installed in its proper position on display cart 10 as previously described, the shelf back 111 is also used. Shelf back 111 is installed on display cart 10 by simply positioning the back in a vertical plane above the back surface of the display cart so that pins 124-126 are inserted into the holes 128 of horizontal support member 80.

It has been described how the display capacity of the display vehicle 10 can be increased by adding an upper shelf 110, and it has been pointed out that it is not intended that the display shelf be used when the display vehicle is being used to transport beverages or other products from one location to another. In a similar manner, the area adjacent and immediately in front of the display surface 21 can be extended to provide additional display capacity. This is accomplished by unfolding and inserting the lower display shelf 112 as shown in the lower portion of FIG. 8.

Details of the lower display shelf 112 are shown in FIGS. 23-26. A sign display panel, shown generally as 130 in FIG. 26, is fabricated from sheet metal and has a generally rectangular shape. Within the display panel is formed a depressed area 143 of substantially the same shape as the panel for reinforcing the panel and for outlining an area upon which may be located a sign — i.e., an advertisement of the goods or displayed products. The upper portion of the display panel 130 is further reinforced by bending a narrow lip 131 along the entire longitudinal edge of the panel.

Figure 25:
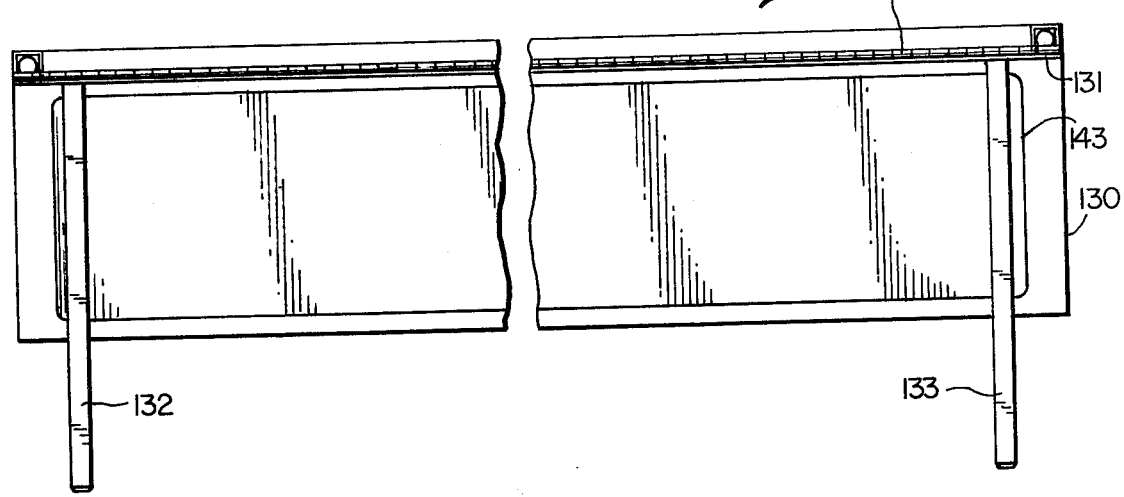

As best seen in FIG. 25 two supporting legs 132 and 133 are fabricated from solid stock having a square cross-section and are fastened adjacent the ends of the display panel 130 by welding or other suitable means. The supporting legs 132 and 133 have a length equal to approximately twice the width of the display panel 130 and are chamfered at the lower end to provide a smooth surface and attractive appearance.

One leaf of hinge member 134 is attached by welding, riveting or other suitable means to the longitudinal lip member 131 of the display panel 130. The other leaf of the piano type hinge 134 is attached to one long edge of the horizontal shelf member 135. The remaining three edges of the horizontal shelf member 135 are reinforced by means of fabricated or extruded members 136-138, having a square cross-section, which are fastened to the shelf member by suitable means.

To the reinforcing members 136 and 138, which are located at the extreme end of the horizontal shelf member 135, are attached supporting pins 139 and 140. Pins 139 and 140 are fabricated of cylindrical solid stock and are attached to reinforcing members 136 and 138 by welding, riveting or other suitable means.

Figure 23:
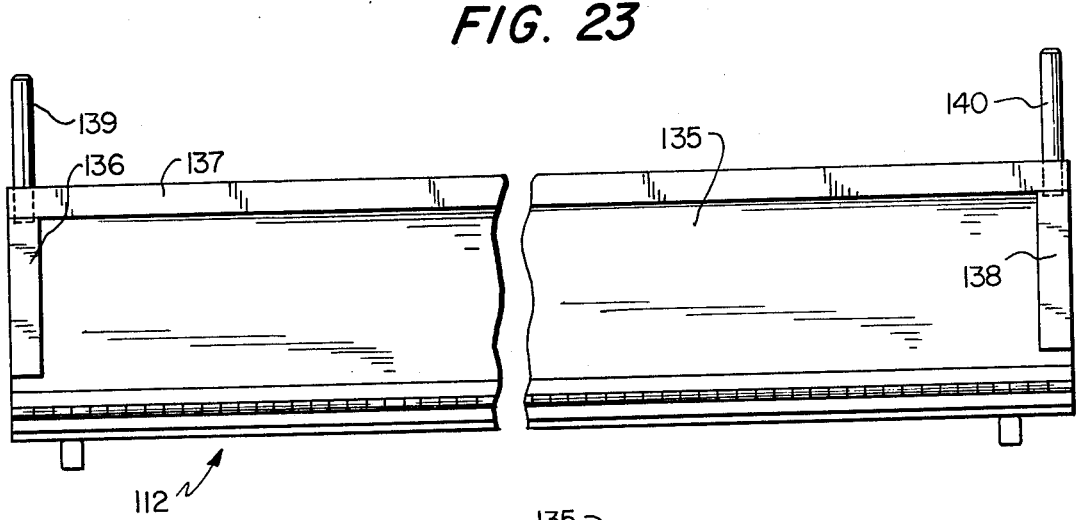
FIGS. 23-25 are the front elevational, side elevational and plan views of the extension shelf.
Figure 24:
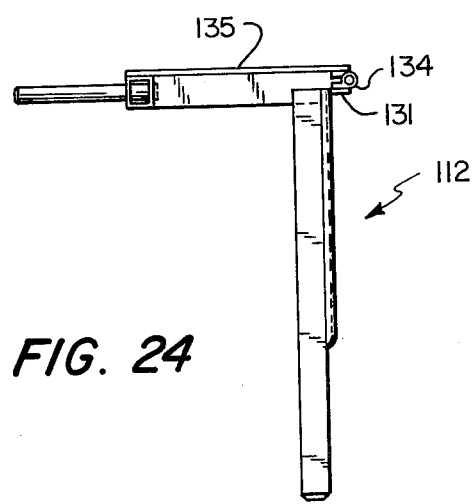

When it is desired to increase the display capacity of the display vehicle 10 by adding the lower extension shelf 112, the shelf 112 is removed from its storage location 103 as shown in FIG. 4, and unfolded to form the confirugation as shown in FIG. 24, and positioned on the display cart 10 as shown in FIG. 8. The lower extension shelf 112 is supported in its display position by inserting the pins 139 and 140, as best seen in FIG. 23, into openings 141 and 142 shown in FIG. 5.

FIG. 28 is a somewhat different embodiment of the display cart 10 which includes a modification of the reinforcing bracket 72 as shown in FIG. 1. As seen in FIG. 28, the reinforcing bracket, shown generally as 150, is constructed from fabricated or extruded tubular material which has a square cross-section. The lower end of section 150A and the upper end of section 150B have been cut at an angle so that with the end surfaces mating together, the included angle 152 is substantially 120°. Section 150A is welded to section 150B around the entire peripheral surface of joint 151.

The lower end of section 150B is welded to rear base frame 16 so that it is secured in substantially vertical position. The upper end of section 150A is cut at an angle so that the entire face of the section can be welded securely to vertical support member 61, thus reinforcing the attachment of the support member 61 to channel 18.

A band 160 as best seen in FIGS. 7 and 28 is used to hold upper shelf 110, shelf back 111 and lower extension shelf 112 in position when stored in storage space 103. This band 160 is detachable and its use is optional.

Many modifications and variations may be made to the transport, storage and merchandising vehicle without departing from the purpose and spirit of this invention, and such modifications are contemplated within the scope of the appended claims.

What is claimed is:

1. A portable display vehicle for transporting, storing and displaying food, beverage and other displayable products comprising:
    a base member having a rear edge, said base member including a plurality of casters attached to the underside of said base member for supporting the vehicle in an upright and stable condition,
    sidewalls attached in a vertical position to the sides of said base member,
    an L-shaped product support member comprising a back wall attached to a bottom shalf wherein said support member is attached to said base member between said sidewalls so that said bottom shelf slopes downwardly toward the rear edge of said base member and wherein said sidewalls and said product support member form an open volume for containing the displayed products, said sidewalls each being bounded by rigid frame members with a continuous skin member rigidly supported between said frame members and each having an upper frame slanting downward from the top of said back wall and away from said rear edge,
    a substantially vertically oriented front panel extending downwardly from the front edge of said bottom shelf to a position below said base member so as to shield at least a portion of said casters from view, and
    a lower extension shelf for extending the surface formed by said bottom shelf,
    said lower extension shelf comprising a horizontal shelf member extending from the front edge of said bottom shelf, a vertically oriented sign display panel for displaying written material extending downwardly from the forward edge of said horizontal shelf member, a hinge member for attaching said horizontal shelf member and said sign display panel, and a plurality of supporting legs extending downwardly from said sign display panel.

2. A display vehicle as defined in claim 1 wherein said plurality of casters includes at least one combination fixed and swivel caster which includes means for manually locking said caster to prevent it from pivoting.

3. A display vehicle as defined in claim 2 wherein said plurality of casters comprises two combination fixed and swivel casters and two swivel casters.

4. A display vehicle as defined in claim 2 wherein said means for manually locking said pivotal casters includes a pin situated adjacent to said pivotal caster and adapted to be received in an indentation contained in said pivotal caster thereby locking said caster and a means remote from said pin by which said pin may be pulled away from said indentation.

5. A display vehicle as defined in claim 4 wherein said pin is associated with a spring which normally forces said pin in the direction of and against said pivotal caster.

6. A display vehicle as defined in claim 1 wherein said back wall of said L-shaped product support member is attached at about a right angle to said bottom shelf of said L-shaped product support member.

7. A display vehicle as defined in claim 6 wherein the back of said L-shaped product support member slopes toward the front of the display vehicle from top to bottom, thereby forming a V-shaped storage compartment, said compartment being bounded on one side by the bottom of said back wall and on the other side by the top of said base member.

8. In combination, a display vehicle as defined in claim 1 and further including an upper shelf positioned above the open volume formed by said L-shaped product support member and said sidewalls for supporting an additional quantity of the displayable products, said upper shelf including a plurality of support legs receivable in apertures in said sidewall upper frames.

9. In combination, a display device as defined in claim 1 and a back support member separately attached to the top of the back wall of said L-shaped product support member for supporting the product displayed above the top of the back wall of said L-shaped product support member.

10. A display vehicle as defined in claim 1 wherein said base member is generally rectangular and includes an elongated front base frame, an elongated rear base frame parallel to and spaced from said front base frame, and two spaced and parallel end channel and caster assemblies, each assembly rigidly interconnecting one end of each of said front and rear base frames.

11. A portable display vehicle for transporting, storing and displaying food, beverage and other displayable products comprising:
    a base member having a rear edge, said base member including a plurality of casters attached to the underside of said base member for supporting the vehicle in an upright and stable condition,
    sidewalls attached in a vertical position to the sides of said base member,
    an L-shaped product support member comprising a back wall attached to a bottom shelf wherein said support member is attached to said base member between said sidewalls so that said bottom shelf slopes downwardly toward the rear edge of said base member and wherein said sidewalls and said product support member form an open volume for containing the displayed products, said sidewalls each being bounded by rigid frame members with a continuous skin member rigidly supported between said frame members and each having an upper frame slanting downward from the top of said back wall and away from said rear edge, and an upper shelf positioned above the open volume formed by said L-shaped product support member and said sidewalls for supporting an additional quantity of the displayable products, said upper shelf including a plurality of support legs receivable in apertures in said sidewall upper frames, said upper shelf further including a back support member separately attached to the top of the back wall of said L-shaped product support member for preventing the displayable products from being displaced rearwardly on said upper support shelf.

12. A portable display vehicle for transporting, storing and displaying food, beverage and other displayable products comprising:

a base member having a rear edge, said base member including a plurality of casters attached to the underside of said base member for supporting the vehicle in an upright and stable condition, sidewalls attached in a vertical position to the sides of said base member, and an L-shaped product support member comprising a back wall attached to a bottom shelf wherein said support member is attached to said base member between said sidewalls so that said bottom shelf slopes downwardly toward the rear edge of said base member and wherein said sidewalls and said product support member form an open volume for containing the displayed products, said sidewalls each being bounded by rigid frame members with a continuous skin member rigidly supported between said frame members and each having an upper frame slanting downward from the top of said back wall and away from said rear edge, said plurality of casters including at least one combination fixed and swivel caster which includes means for manually locking said caster to prevent it from pivoting, said means for manually locking said pivotal casters including a pin situated adjacent to said pivotal caster and adapted to be received in an indentation contained in said pivotal caster thereby locking said caster and a means remote from said pin by which said pin may be pulled away from said indentation, said means remote from said pin including a hand grippable member located on the top of one of said sidewall upper frames and a cable coupled to said hand grippable member at one end and to said pin at the other end, said cable passing through a portion of one of said sidewalls.

* * * * *